United States Patent
Gross et al.

(10) Patent No.: US 11,323,063 B2
(45) Date of Patent: May 3, 2022

(54) HELIOSTAT WITH TRIPOD STAND AND TOP-MOUNTED OPTICAL MEMBER

(71) Applicant: Heliogen, Inc., Pasadena, CA (US)

(72) Inventors: William Gross, Pasadena, CA (US); Andrea Pedretti, Bellinzona (CH)

(73) Assignee: Heliogen, Inc., Pasadena, CA (US)

( * ) Notice: Subject to any disclaimer, the term of this patent is extended or adjusted under 35 U.S.C. 154(b) by 0 days.

(21) Appl. No.: 17/114,845

(22) Filed: Dec. 8, 2020

(65) Prior Publication Data

US 2021/0175843 A1 Jun. 10, 2021

Related U.S. Application Data

(60) Provisional application No. 62/946,333, filed on Dec. 10, 2019.

(51) Int. Cl.
*H02S 30/10* (2014.01)
*H02S 20/30* (2014.01)

(52) U.S. Cl.
CPC .............. *H02S 30/10* (2014.12); *H02S 20/30* (2014.12)

(58) Field of Classification Search
CPC ................................ H02S 30/10; H02S 20/30
See application file for complete search history.

(56) References Cited

U.S. PATENT DOCUMENTS

| | | | |
|---|---|---|---|
| 5,259,635 A | 11/1993 | Picker | |
| 5,461,515 A | 10/1995 | Sorce | |
| 5,573,260 A | 11/1996 | Peterson et al. | |
| 5,904,398 A | 5/1999 | Farricielli | |
| 6,046,399 A | 4/2000 | Kapner | |
| 6,067,982 A | 5/2000 | Harrison | |
| 6,899,096 B2 | 5/2005 | Nakamura | |
| 7,819,114 B2 | 10/2010 | Augenbraun et al. | |
| 7,823,583 B2 | 11/2010 | Allen et al. | |
| 7,905,227 B2 | 3/2011 | Luconi | |
| 8,119,962 B2 | 2/2012 | Scanlon | |
| 8,122,878 B1 | 2/2012 | Gross et al. | |
| 8,399,759 B2 | 3/2013 | Luo | |
| 8,590,527 B2 | 11/2013 | Luconi et al. | |
| 9,010,317 B1 | 4/2015 | Gross | |
| 9,020,636 B2 | 4/2015 | Tadayon | |

(Continued)

FOREIGN PATENT DOCUMENTS

| | | |
|---|---|---|
| CN | 101784844 A | 7/2010 |
| CN | 202145459 U | 2/2012 |

(Continued)

OTHER PUBLICATIONS

International Search Report and Written Opinion regarding International Application No. PCT/US2020/063780, dated Mar. 29, 2021, 12 pages.

(Continued)

*Primary Examiner* — Jayne L Mershon
(74) *Attorney, Agent, or Firm* — Knobbe, Martens, Olson & Bear LLP

(57) ABSTRACT

A heliostat includes an optical member (e.g., a mirror), a mounting frame under the optical member, a support stand and a hinge assembly. The hinge assembly allows the optical member to pivot about two orthogonal directions relative to the support stand. A drive mechanism adjusts one or both of an elevation angle and a roll angle of the optical member.

18 Claims, 15 Drawing Sheets

(56) References Cited

U.S. PATENT DOCUMENTS

| | | | |
|---|---|---|---|
| 9,322,574 B2 | 4/2016 | von Behrens | |
| 9,443,992 B2 | 9/2016 | Adler et al. | |
| 9,446,568 B2 | 9/2016 | Larson | |
| 11,082,001 B2 | 8/2021 | Gross et al. | |
| 2007/0272234 A1 | 11/2007 | Allen | |
| 2008/0041364 A1 | 2/2008 | Brock | |
| 2010/0071684 A1* | 3/2010 | Cowan | F24S 25/10 126/605 |
| 2010/0206294 A1 | 8/2010 | Blair et al. | |
| 2011/0000478 A1 | 1/2011 | Reznik | |
| 2011/0117276 A1 | 1/2011 | Boffa et al. | |
| 2011/0100422 A1 | 5/2011 | Schwarze | |
| 2012/0318325 A1* | 12/2012 | Liu | F24S 25/70 136/246 |
| 2013/0021471 A1 | 1/2013 | Waterhouse et al. | |
| 2013/0042856 A1* | 2/2013 | Switkes | F24S 30/455 126/606 |
| 2013/0206173 A1 | 8/2013 | Zijlstra | |
| 2013/0314812 A1 | 11/2013 | Tharisayi | |
| 2014/0251315 A1 | 9/2014 | Patwardhan | |
| 2018/0076757 A1* | 3/2018 | Gross | H02S 30/00 |
| 2019/0107598 A1 | 4/2019 | Plourde et al. | |
| 2019/0372513 A1 | 12/2019 | Gross et al. | |

FOREIGN PATENT DOCUMENTS

| | | |
|---|---|---|
| CN | 203902398 U | 10/2014 |
| CN | 205505445 U | 8/2016 |
| KR | 2010-0061271 A | 6/2010 |
| WO | WO 2011/066315 A1 | 6/2011 |

OTHER PUBLICATIONS

Sunsystems brochure Tensile Structures in Steel Cables to Install Photovoltaic Systems with No Limits and in a Competitive Way, available before Sep. 9, 2016, 6 pp.

* cited by examiner

HELIOSTAT WITH TRIPOD STAND AND TOP-MOUNTED OPTICAL MEMBER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The invention generally pertains to a heliostat device for capturing solar energy. In particular, the invention relates to an optical member (e.g., mirror or photovoltaic panel) suspended from a tripod frame for tracking the sun for purposes of converting sunlight to useable energy.

Description of the Related Art

Conventional heliostats are prohibitively expensive to build and install. These conventional heliostats include mirrors or photovoltaic panels, which can experience extreme forces in windy conditions. To withstand the wind loading, conventional heliostats are generally constructed from structural steel and anchored into the ground with posts and concrete. Steel, however, is a relatively expensive building material, and the labor cost to drill and set posts is comparable to the price of the heliostat itself. Conventional heliostats are also complex and can be difficult and/or costly to maintain.

SUMMARY

There is therefore a need for a cost-effective heliostat that is simple in design and relatively simple to maintain.

In accordance with aspect of the disclosure, a heliostat is provided comprising an optical member (e.g., a mirror), a mounting frame under the optical member, a support stand and a hinge assembly that pivotally couples the support stand and the mounting frame. The hinge assembly allows for the adjustment of an elevation angle and a roll angle of the optical member. In one optional implementation, the hinge assembly is a two-axis hinge with a first axis that is orthogonal to a second axis.

In accordance with one aspect of the disclosure, a heliostat is provided. The heliostat comprises an optical member, a mounting frame disposed behind the optical member, and a stand configured to support the mounting frame and optical member thereon, the stand comprising a first plurality of linear members that extend to an upper portion of the stand disposed below the mounting frame. A hinge has a first portion coupled to the upper end of the stand and a second portion coupled to the mounting frame. The second portion is configured to pivot relative to the first portion in a first direction, and the second portion is further configured to pivot relative to the first portion in a second direction that is orthogonal to the first direction.

In accordance with another aspect of the disclosure, a heliostat is provided. The heliostat comprises an optical member and a mounting frame disposed behind the optical member. A tripod stand has three stock members that extend to an apex, the tripod stand configured to support the mounting frame and optical member thereon. A plurality of wires are configured to connect the mounting frame and the three stock members. A plurality of actuators are coupled to the mounting frame and operatively coupled to the plurality of wires, the plurality of actuators being operable to adjust one or both of an elevation angle and a roll angle of the optical member.

In accordance with another aspect of the disclosure, a heliostat is provided. The heliostat comprises an optical member, a mounting frame disposed underneath the optical member, and a stand configured to support the mounting frame and optical member thereon, the stand extending to an upper end. A hinge assembly has a first portion coupled to the upper end of the stand and a second portion coupled to the mounting frame. The second portion is configured to pivot relative to the first portion about a first axis, and the second portion is further configured to pivot relative to the first portion about a second axis that is orthogonal to and offset from the first axis. The heliostat further comprises a direct drive means for adjusting one or both of an elevation angle and a roll angle of the optical member.

BRIEF DESCRIPTION OF THE DRAWINGS

The present invention is illustrated by way of example and not limitation in the figures of the accompanying drawings, and in which.

DETAILED DESCRIPTION

Figure 1:
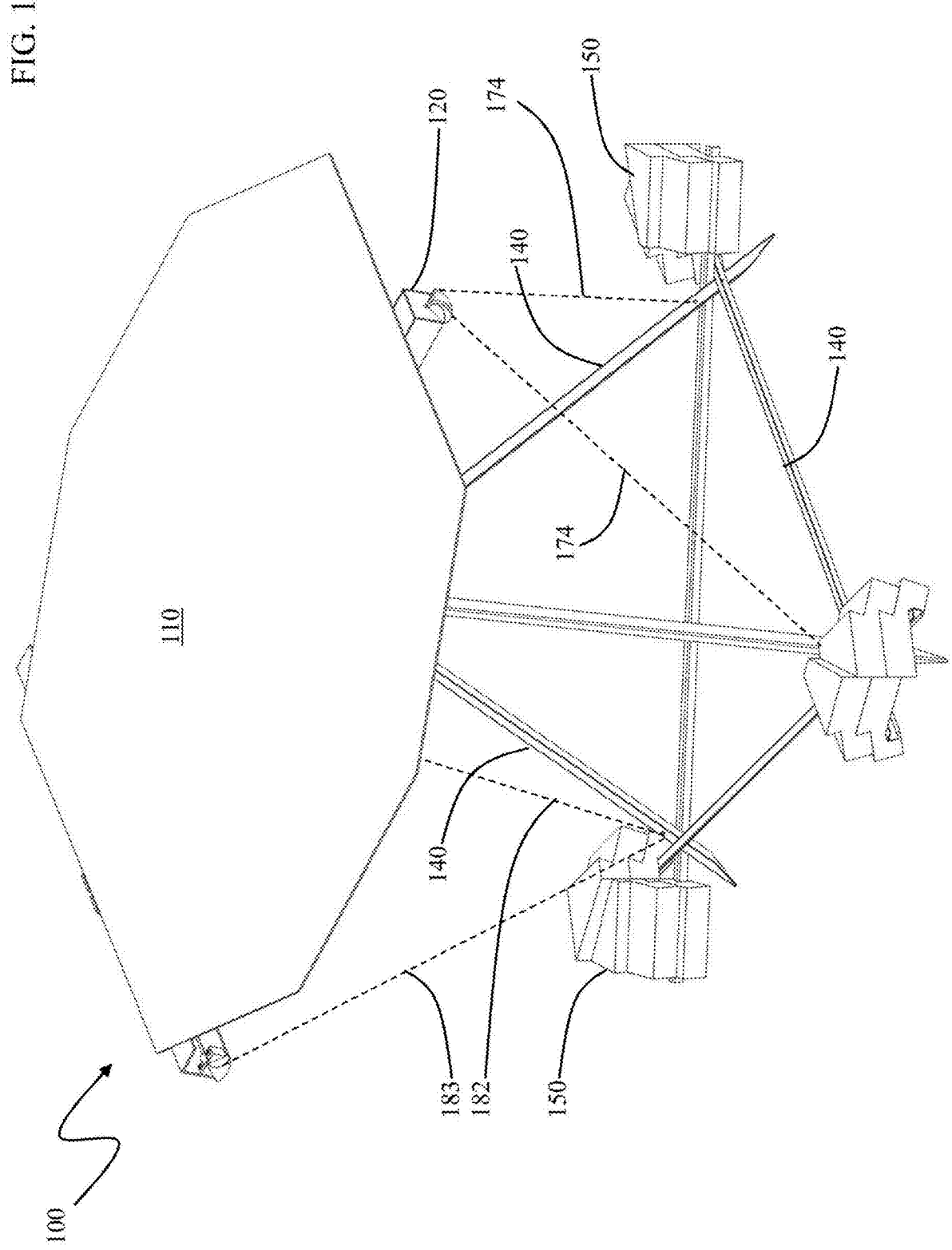
FIG. 1 is an top perspective view of a heliostat in one operating position.
Figure 2:
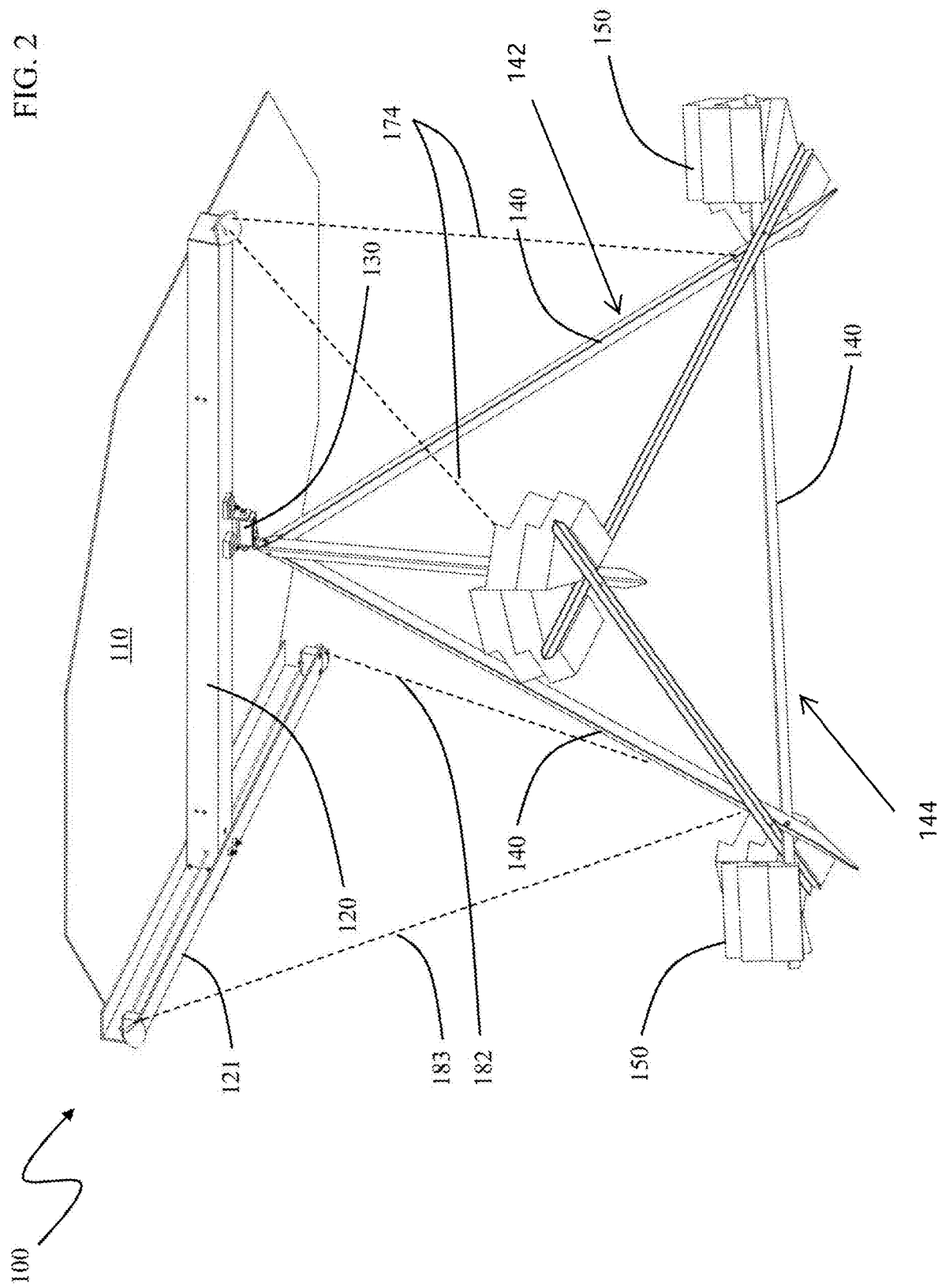
FIG. 2 is a bottom perspective view of the heliostat of FIG. 1.
Figure 3:
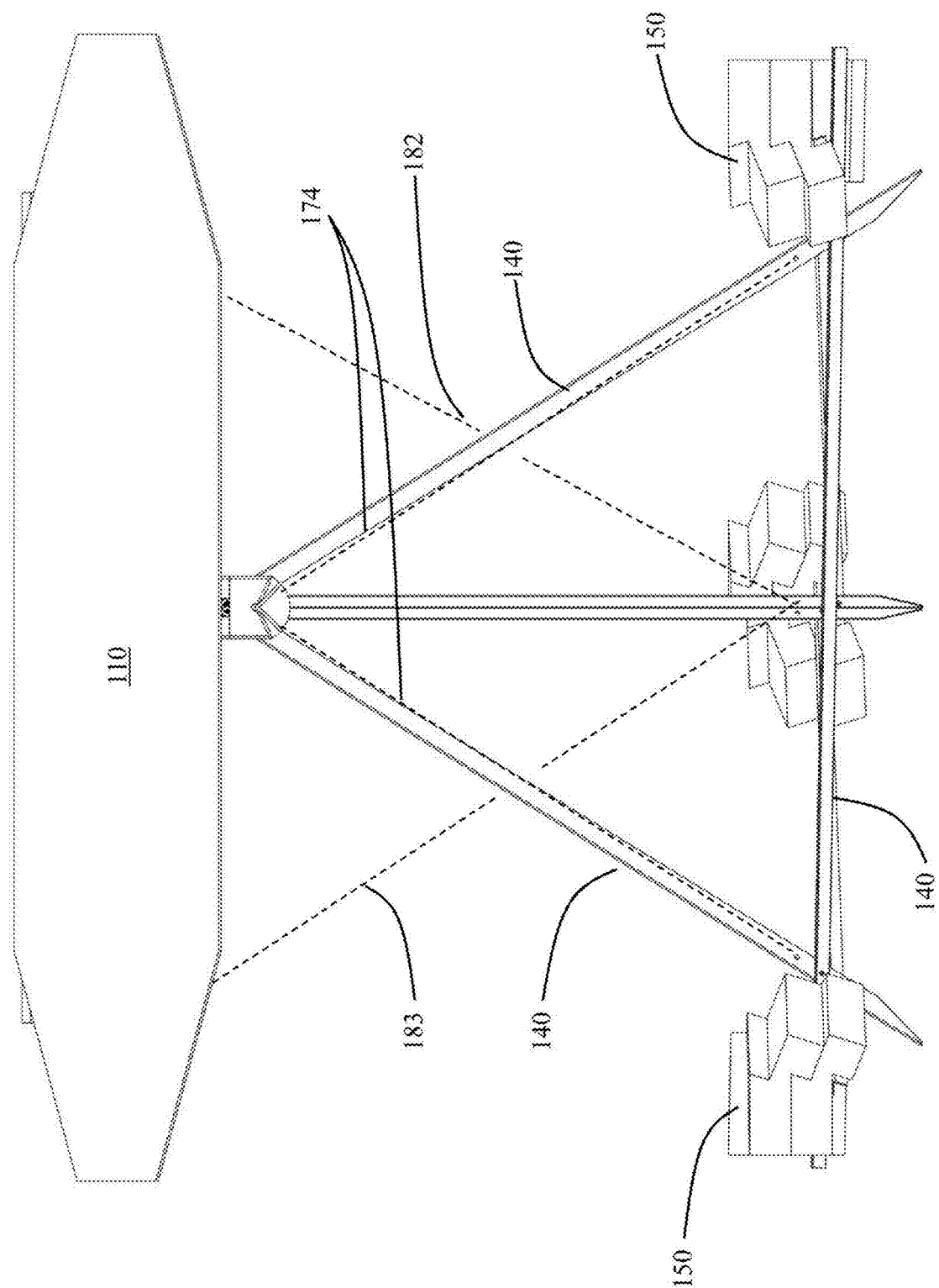
FIG. 3 is a front perspective view of the heliostat of FIG. 1.
Figure 4:
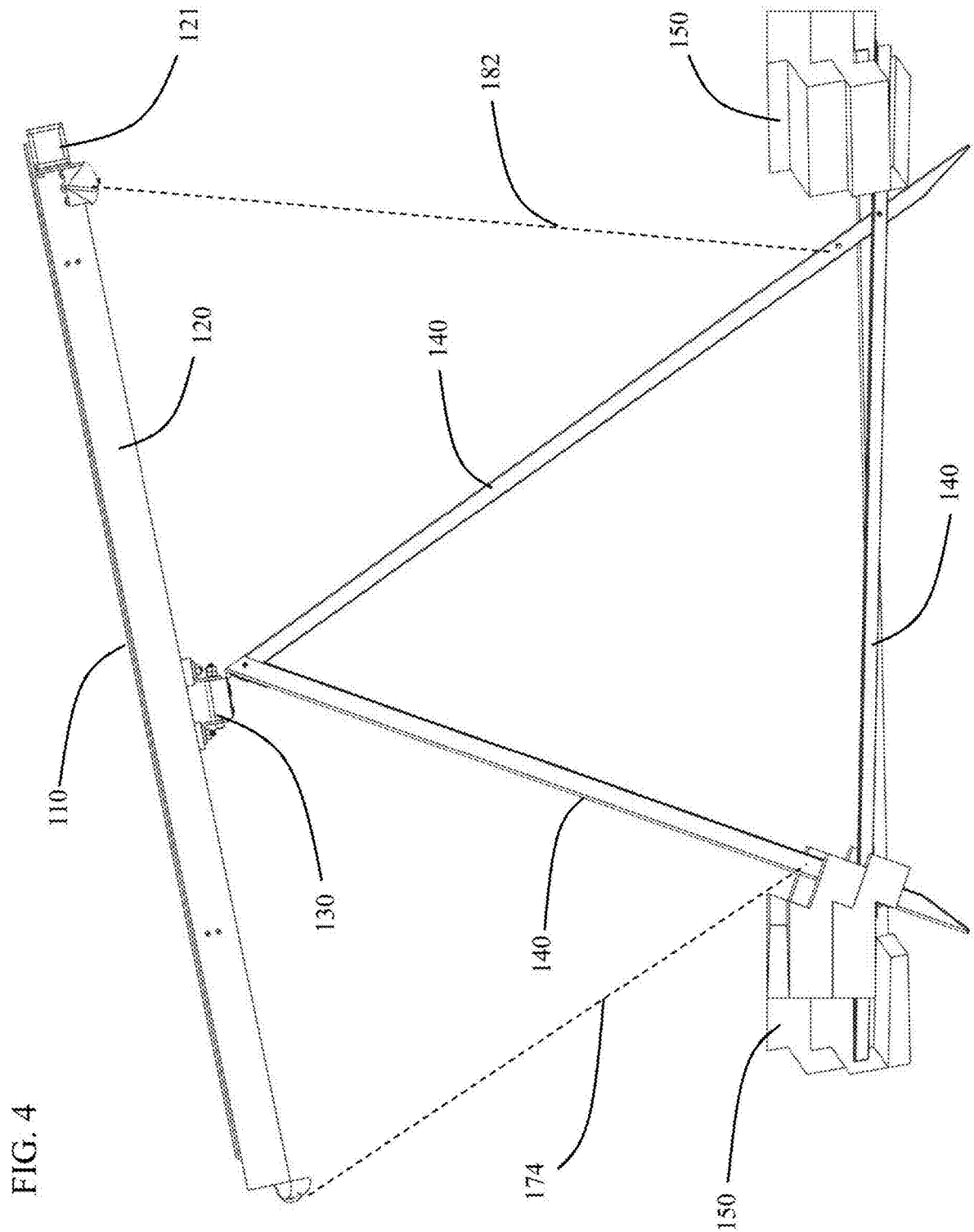
FIG. 4 is a right side view of the heliostat of FIG. 1, the left side view being a mirror image.
Figure 5:
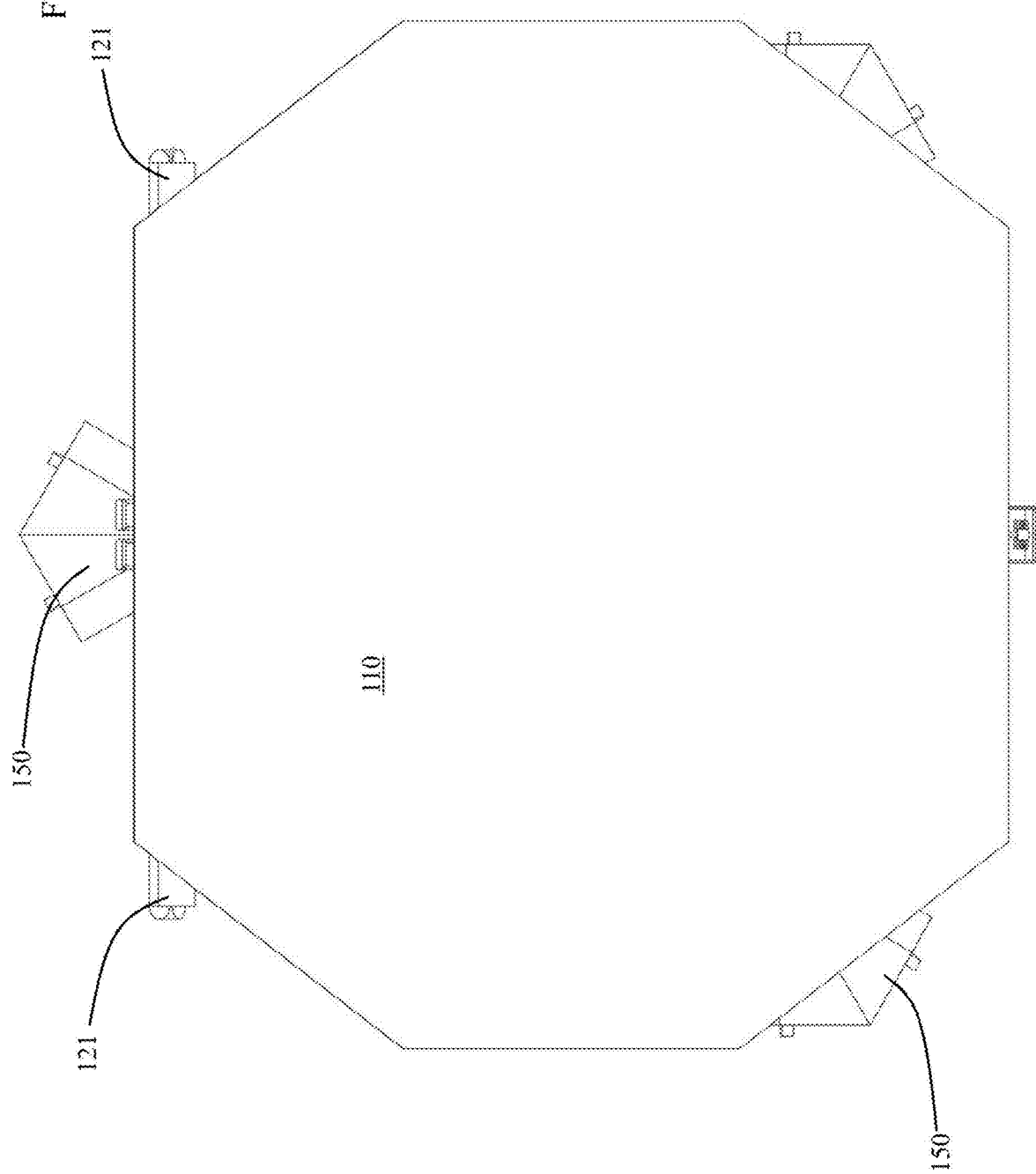
FIG. 5 is a top view of the heliostat of FIG. 1.

A novel heliostat design is disclosed herein that is both highly accurate at redirecting sunlight and extremely inexpensive. As Illustrated in FIGS. 1-5 collectively, the heliostat 100 includes at least one optical member 110. The optical member 110 can be planar (e.g., flat). In one implementation, the optical member 110 is a mirror. In another implementation, the optical member 110 is a photovoltaic panel. The heliostat 100 also includes a backing frame (e.g., support frame) 115 that supports the optical member 110 thereon. For example, the optical member 110 is mounted on the backing frame 115 so that the backing frame 115 is on an underside of the optical member 110. The backing frame 115 can include a first member 120 and second member 121. The heliostat 100 also includes a hinge assembly 130 (e.g., two-axis hinge assembly), a frame or stand 140, at least one ballast unit 150, a first set of control wires 174, and a second set of control wires 182, 183. The first member 120 and second member 121 can protectively conceal the control wire systems. The first and second set of control wires 174, 182, 183 are used to control the elevation angle and the roll angle of the optical member 110 (e.g., mirror) by means of tilting the hinge assembly 130. The stand 140 is preferably a tripod design with a triangular base or a pyramid design with a square base. Ballast units 150 are set atop edges of the stand 140 to resist the force of wind on the optical member 110 (e.g., mirror).

Figure 15:
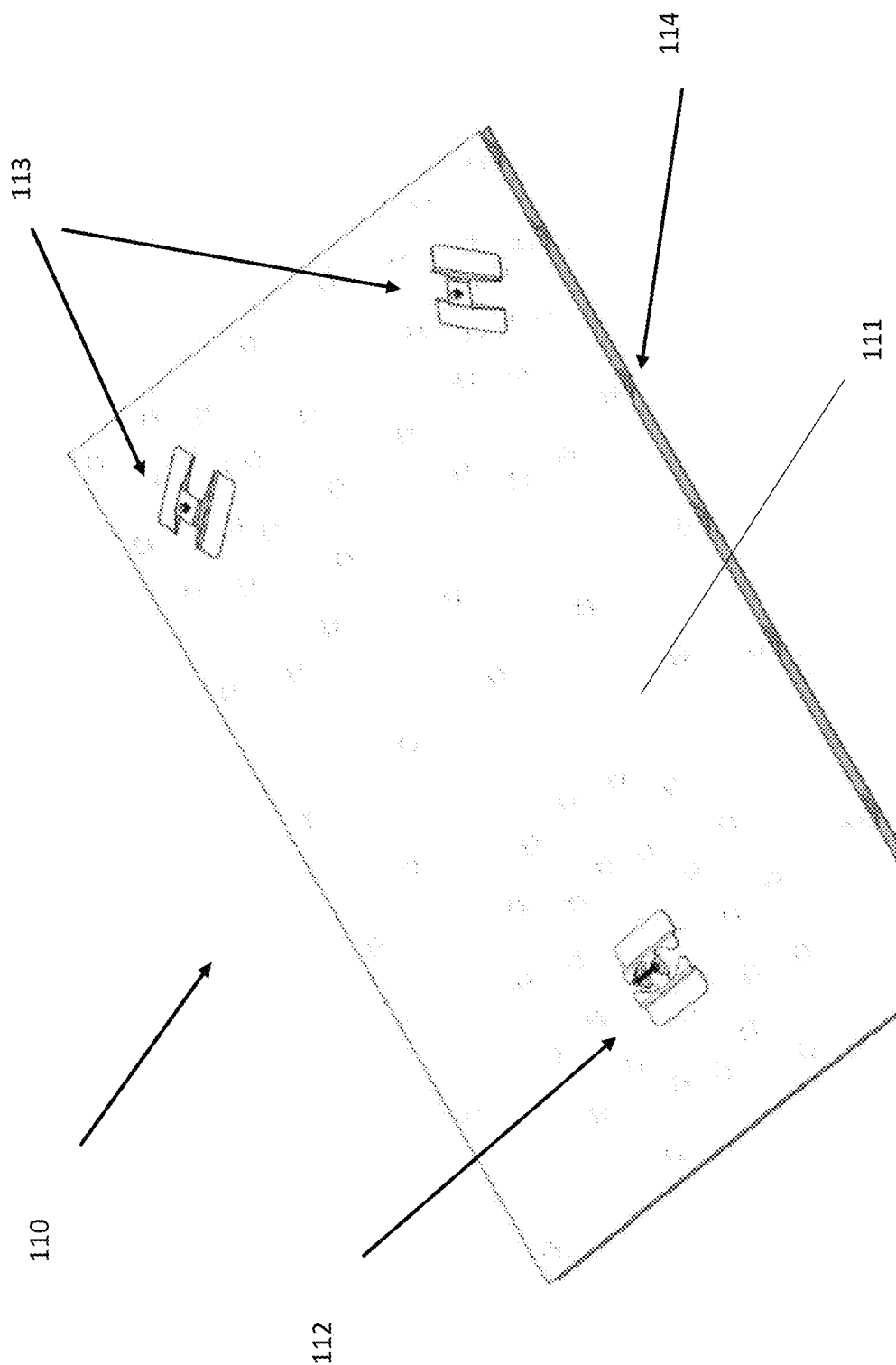
FIG. 15 shows a rear view of the optical member.

As shown in FIG. 15, one or more (e.g., three) brackets 112, 113 are attached to a rear side 111 of the optical member 110 (e.g., mirror). Though FIG. 15 shows the optical member 110 as having a rectangular shape, the optical member 110 can have any suitable shape, such as the octagonal shape of the optical member 110 in FIGS. 1-5 (e.g., the optical member 110 of FIGS. 1-5 can have the brackets 112, 113 on its rear side). For example, the brackets 112, 113 can be bonded (e.g., adhered with an adhesive) to the rear side 111 of the optical member 110. The brackets 112, 113 can couple to (e.g., be bolted to) the backing frame (e.g., support frame) 115. For example, bracket 112 can be coupled to (e.g., bolted to) the first member 120 and brackets 113 can be coupled to (e.g., bolted to) the second member 121. One or more (e.g., a plurality of) spacers 114 can be disposed between the rear side 111 of the optical member 110 and a front side of the optical member 110 (e.g., mirror).

Figure 6:
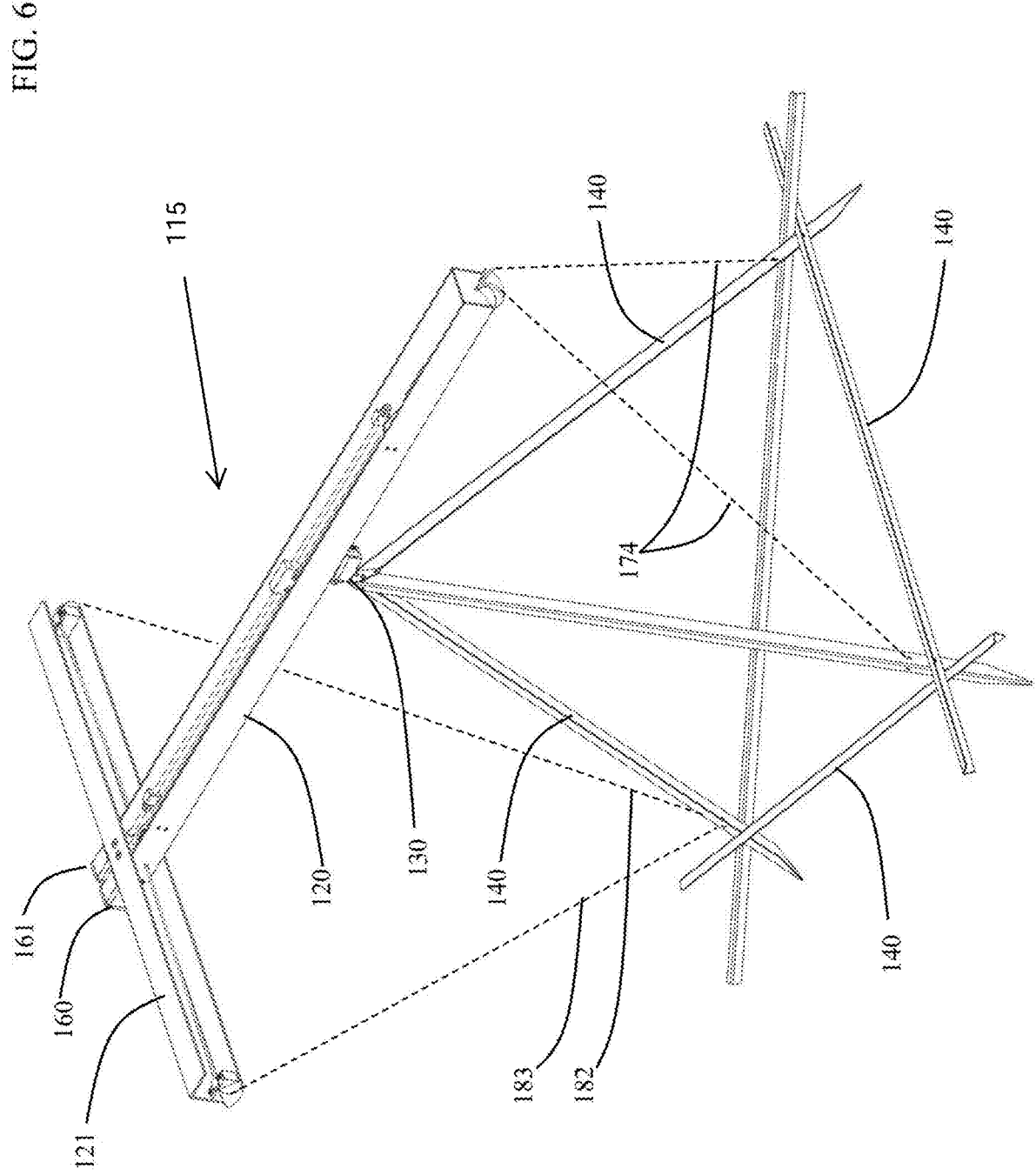
FIG. 6 is a top perspective view of the heliostat of FIG. 1 without an optical member.
Figure 8:
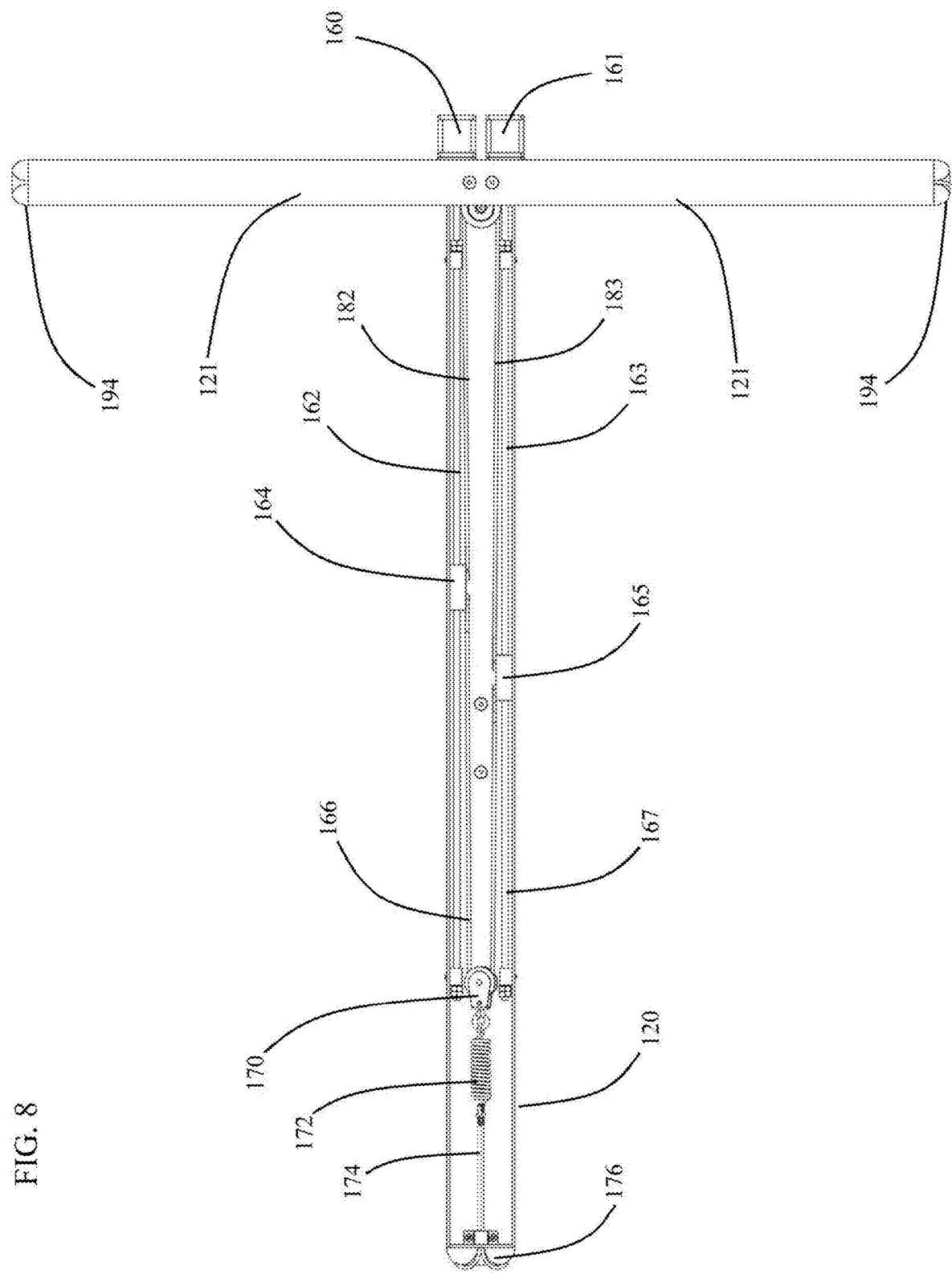
FIG. 8 is a top view of a backing frame of the heliostat of FIG. 1, including a first member and second member.
Figure 12:
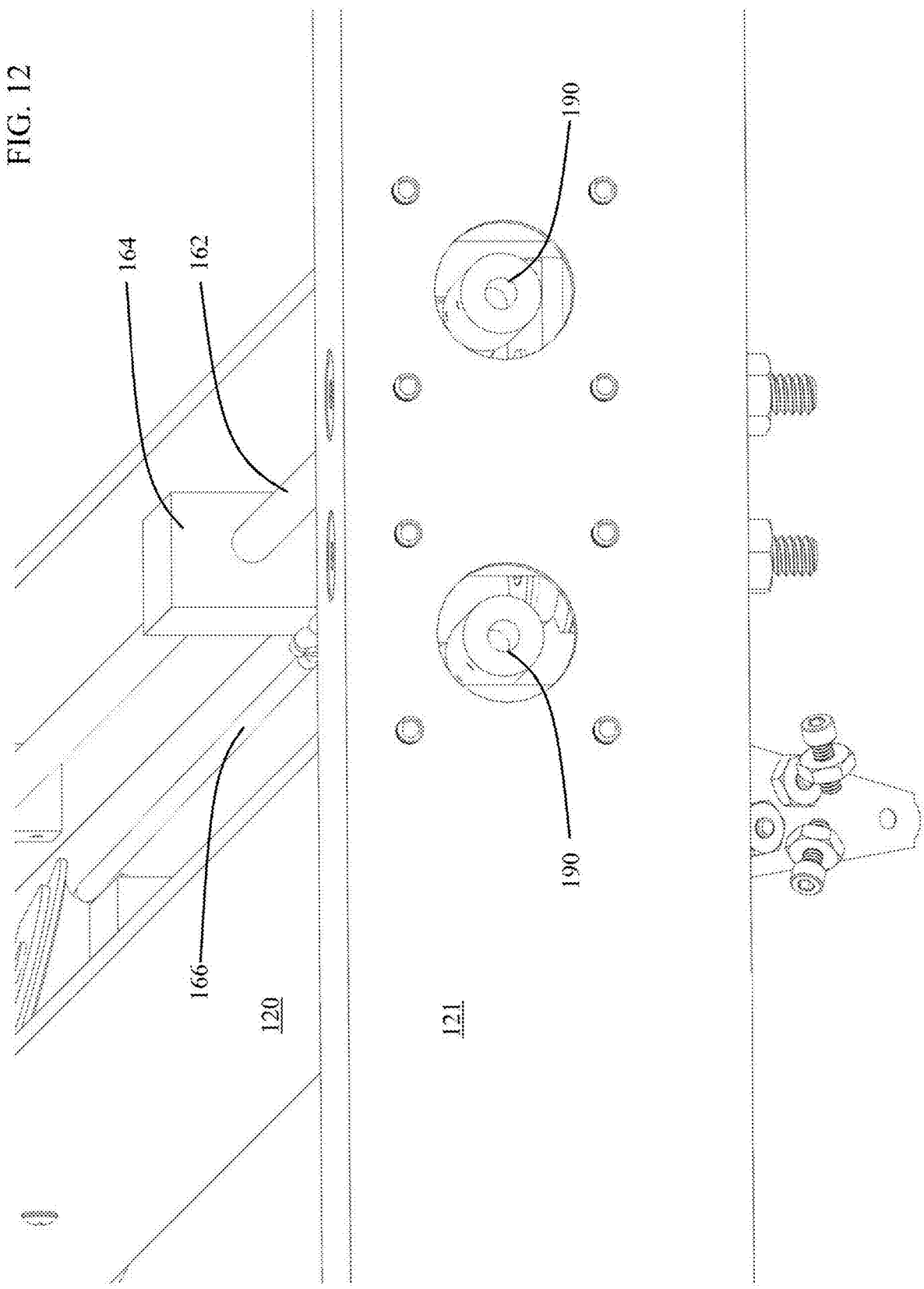
FIG. 12 is a perspective view of a pair of lead screws in the right end portion of the backing frame of FIG. 8.

Illustrated in FIG. 6 is a perspective view of the heliostat 100 without the optical member 110 (e.g., mirror). The first member 120 is a U-shaped channel with the open side facing upward toward the back (e.g., bottom surface) of the optical member 110 (e.g., mirror). The second member 121 is also a U-shaped channel with the open side facing the first member 120. An end of the first member 120 can extend within the U-shaped channel of the second member 121. The first and second members 120, 121 can be arranged in a T-shape (e.g., perpendicular to each other). In one implementation, the first and second members 120, 121 are separate components that are coupled together (e.g., coupled via fasteners such as screws or bolts and nuts, as shown in FIGS. 8, 12). Two motors 160, 161 (e.g., electric motors) for controlling the elevation and roll angles of the optical member 110 (e.g., mirror) are mounted to the second member 121.

The stand can have six sections of aluminum angle stock 140. Three sections 142 for a tripod with an apex adjacent to the hinge assembly 130. The opposite ends of the three sections may include points that penetrate the ground on which the heliostat 100 is mounted. The additional three sections 144 of aluminum angle stock 140 are mounted horizontally to maintain the spacing of the tripod legs. The horizontal sections can extend beyond the length of the tripod legs in order to receive ballast units 150.

The heliostat 100 includes two sets of stainless steel wires or cables to determine the two-dimensional orientation of the optical member 110 (e.g., mirror). The first set of control wires 174 extend from the distal end of the first member 120 down to mounting points on the two forward legs of the tripod. The second set of control wires 182, 183 extend from the distal ends of the second member 121 down to a single mounting point on the third leg of the tripod.

Figure 7:
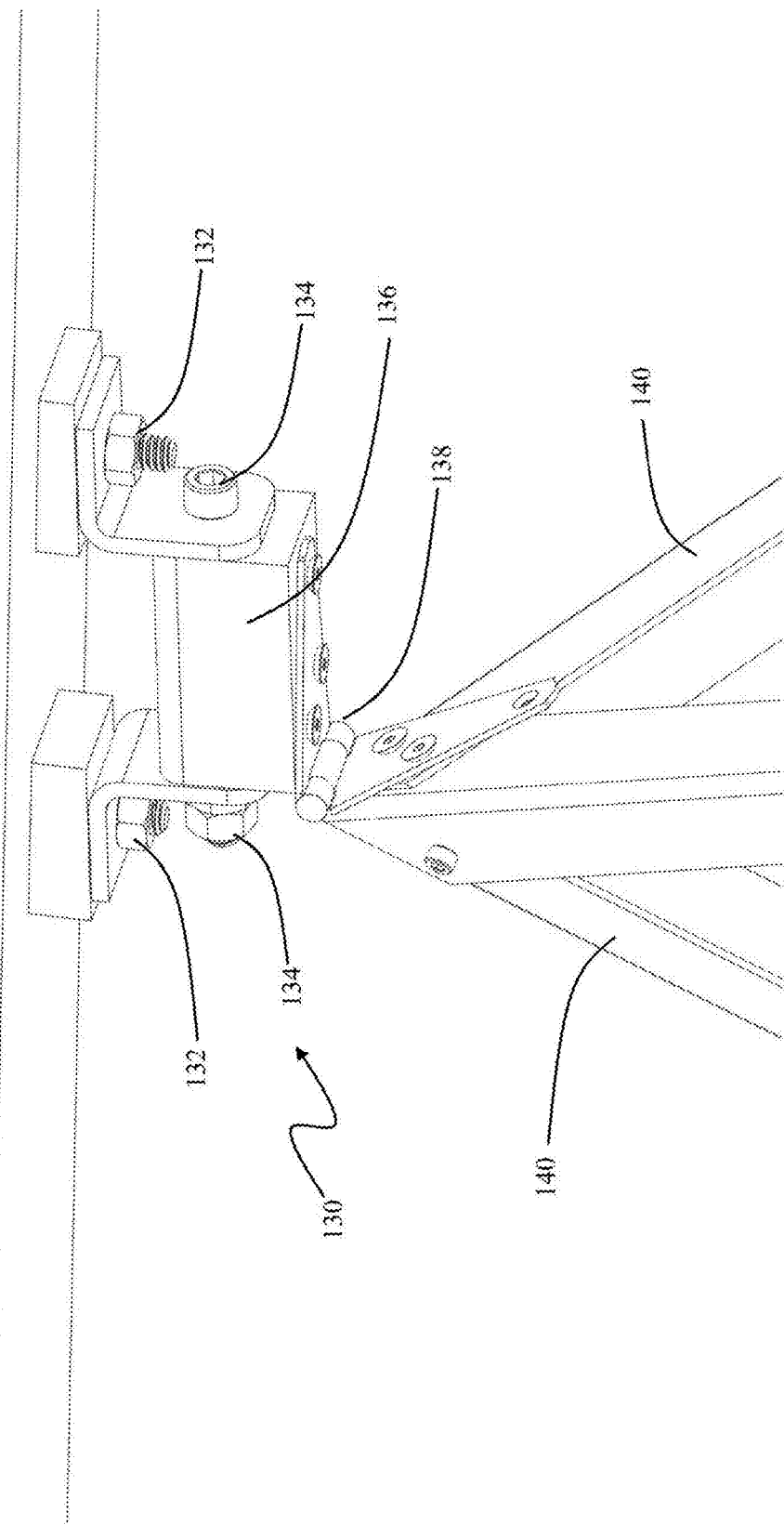
FIG. 7 is an isometric view of a hinge assembly of the heliostat of FIG. 1.

Illustrated in FIG. 7 is a perspective view of the hinge assembly 130. In one implementation, the hinge assembly 130 includes a first axis and second axis orthogonal to the first axis. The first axis and second axis are skewed from one another and do not intersect. The first axis coincides with the longitudinal axis of the nut and bolt combination 134. The second axis coincides with the longitudinal axis of the strap hinge 138. In another implementation, the hinge assembly 130 can be a universal joint. In another implementation, the hinge assembly 130 can be a ball joint.

The first axis is affixed to the first member 120 by means of angle brackets that are rigidly affixed to the bottom of the first member 120 by means of bolts or other fasteners 132. Between the angle brackets is a block 136 to which one plate of the strap hinge 138 is connected. The other plate of the strap hinge 138 is connected directly to the apex of the stand 140. The two hinges work together to enable the optical member 110 (e.g., mirror) to rotate nearly 180 degrees (e.g., less than 180 degrees, such as 140 degrees, 150 degrees, 160 degrees, 170 degrees) front-to-back and left-to-right.

Figure 13:
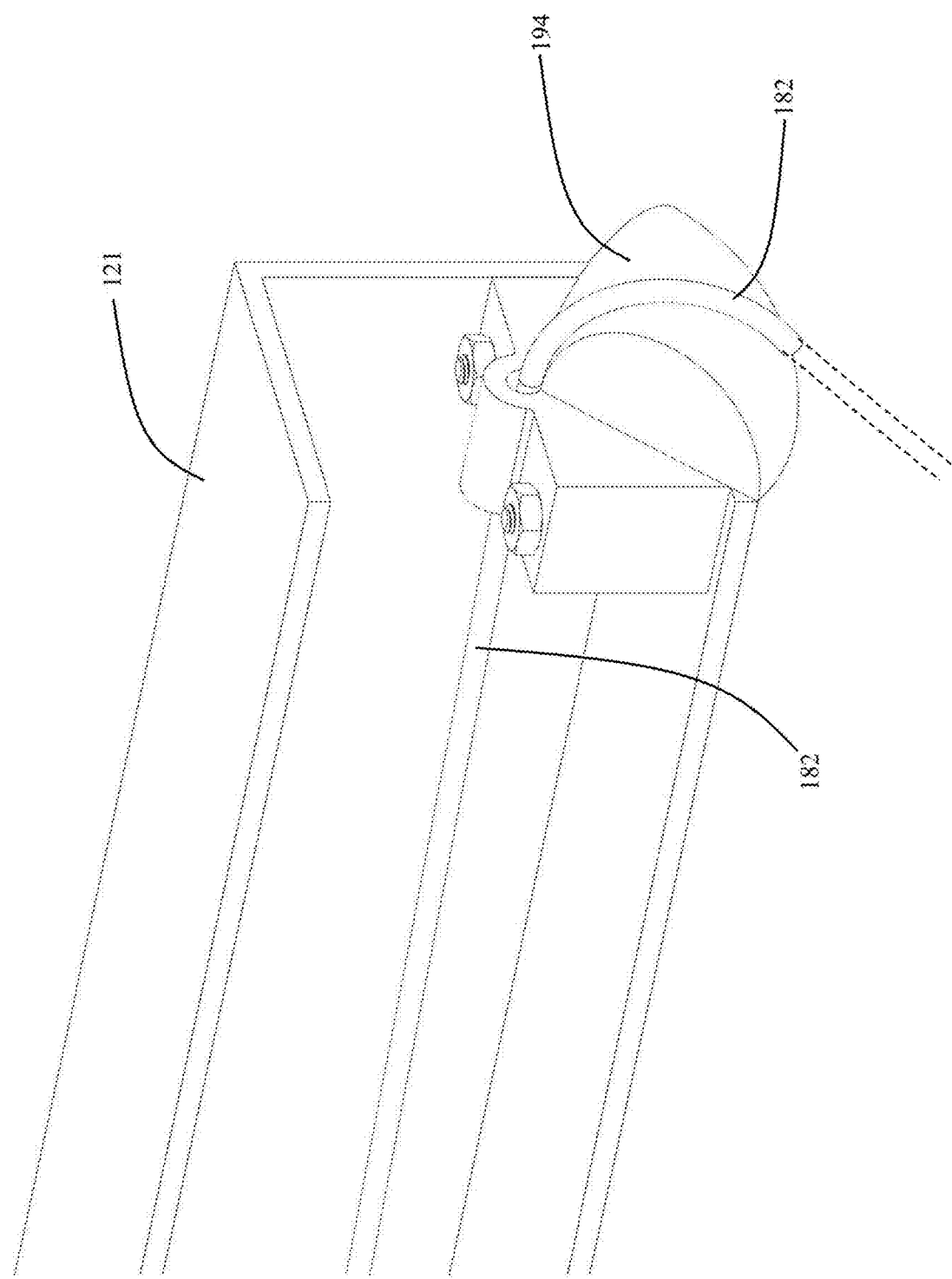
FIG. 13 is a perspective view of a wire guide.
Figure 14:
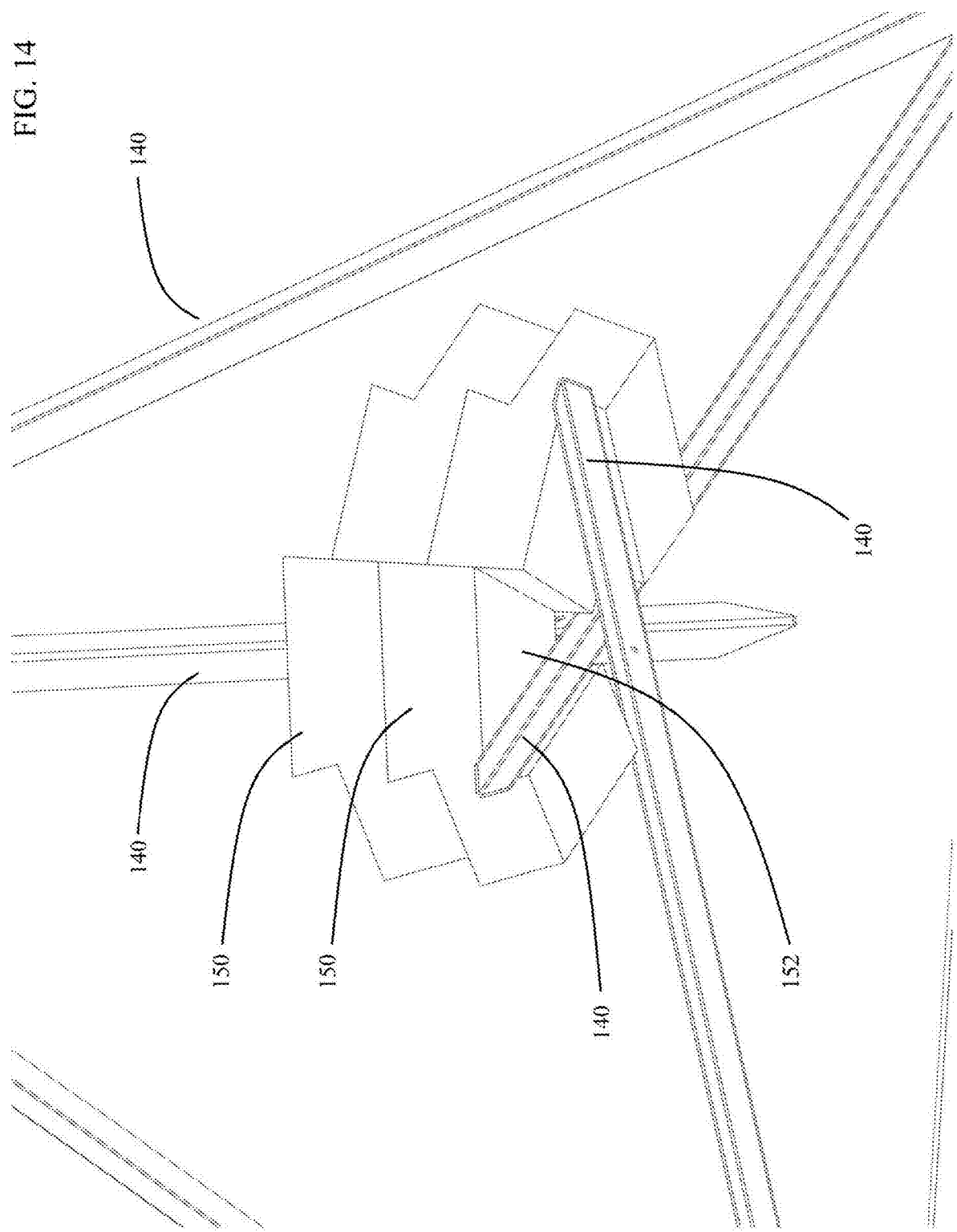
FIG. 14 is a bottom perspective view of a portion of the heliostat in FIG. 1 showing a ballast unit.

Illustrated in FIG. 8 is a top view of the backing frame 115 including a first member 120 and second member 121. The right side, center, and left side of the first member 120 are shown in detail in FIGS. 12-14, respectively. The first motor 160 is co-axially mounted via a coupling 190 to a first lead screw 162 with a square nut 164. Similarly, the second motor 161 is co-axially mounted via a coupling 190 to a second lead screw 163 with another square nut 165. When either lead screw 162, 163 is rotated, the corresponding square nut 163, 165 is made to slide laterally left or right depending on the direction of rotation. The first and second motors 160, 161 (e.g., electric motors) can be powered by a power source (e.g., one or more batteries, a photovoltaic cell of or on the heliostat 100). A controller (e.g., a microcontroller unit or MCU with one or more processors) can control the operation of the first and second motors 160, 162 (e.g., electric motors) to vary one or both of the elevation (e.g., pitch) angle and roll angle of the optical member 110.

The first set of control wires, in the preferred embodiment, include a loop wire or cable and the two control wires 174. The ends of the loop wire 166, 167 are attached to the square nuts 164, 165, respectively. The ends of the loop wire 166, 167 then loop around a pulley 170 which is free to turn in place and to move along the longitudinal axis of the first member 120. The center of the pulley 170 is attached to a helical spring 172 that is in turn affixed to ends of the two control wires 174.

Figure 9:
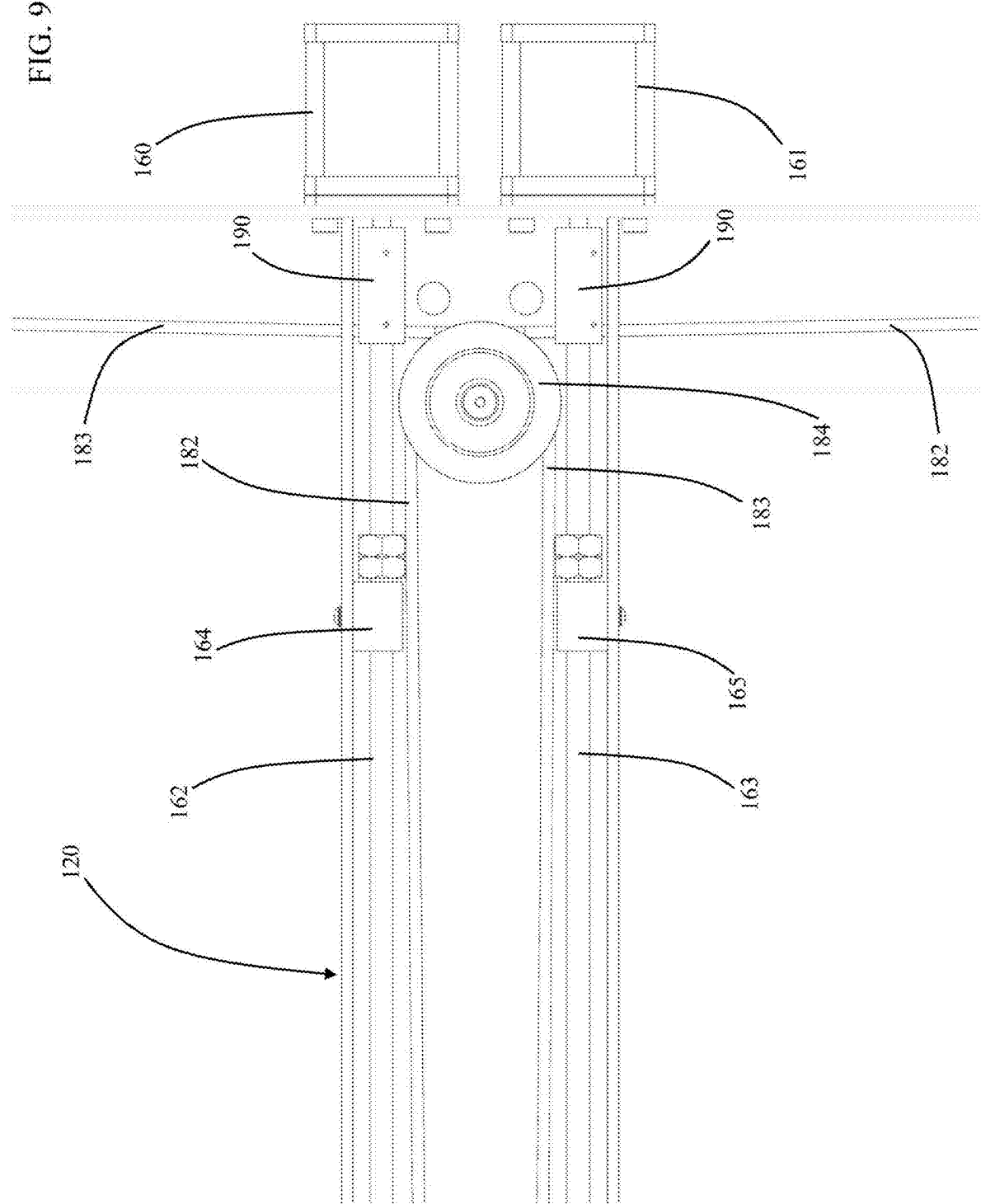
FIG. 9 is an enlarged top view of a right end portion of the backing frame of FIG. 8.
Figure 10:
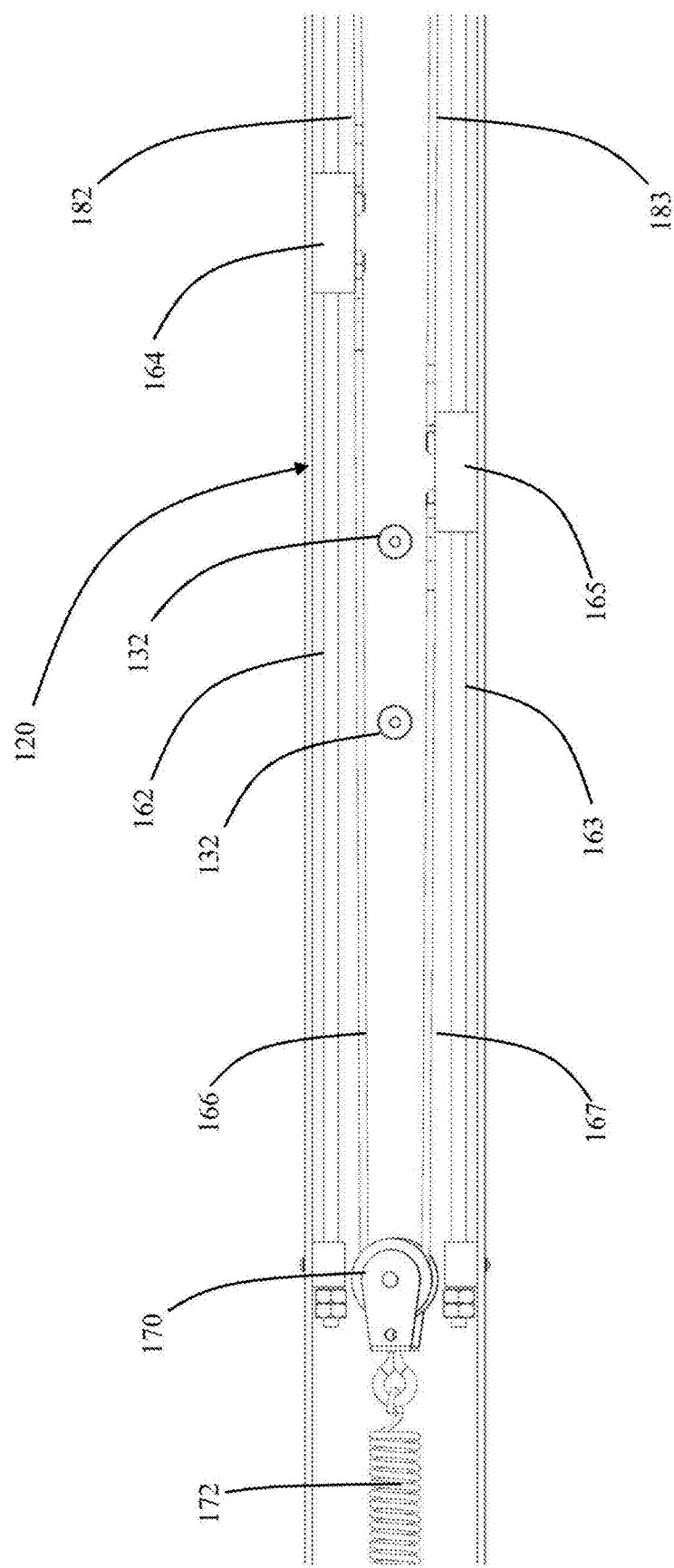
FIG. 10 is an enlarged top view of a middle portion of the backing frame of FIG. 8.
Figure 11:
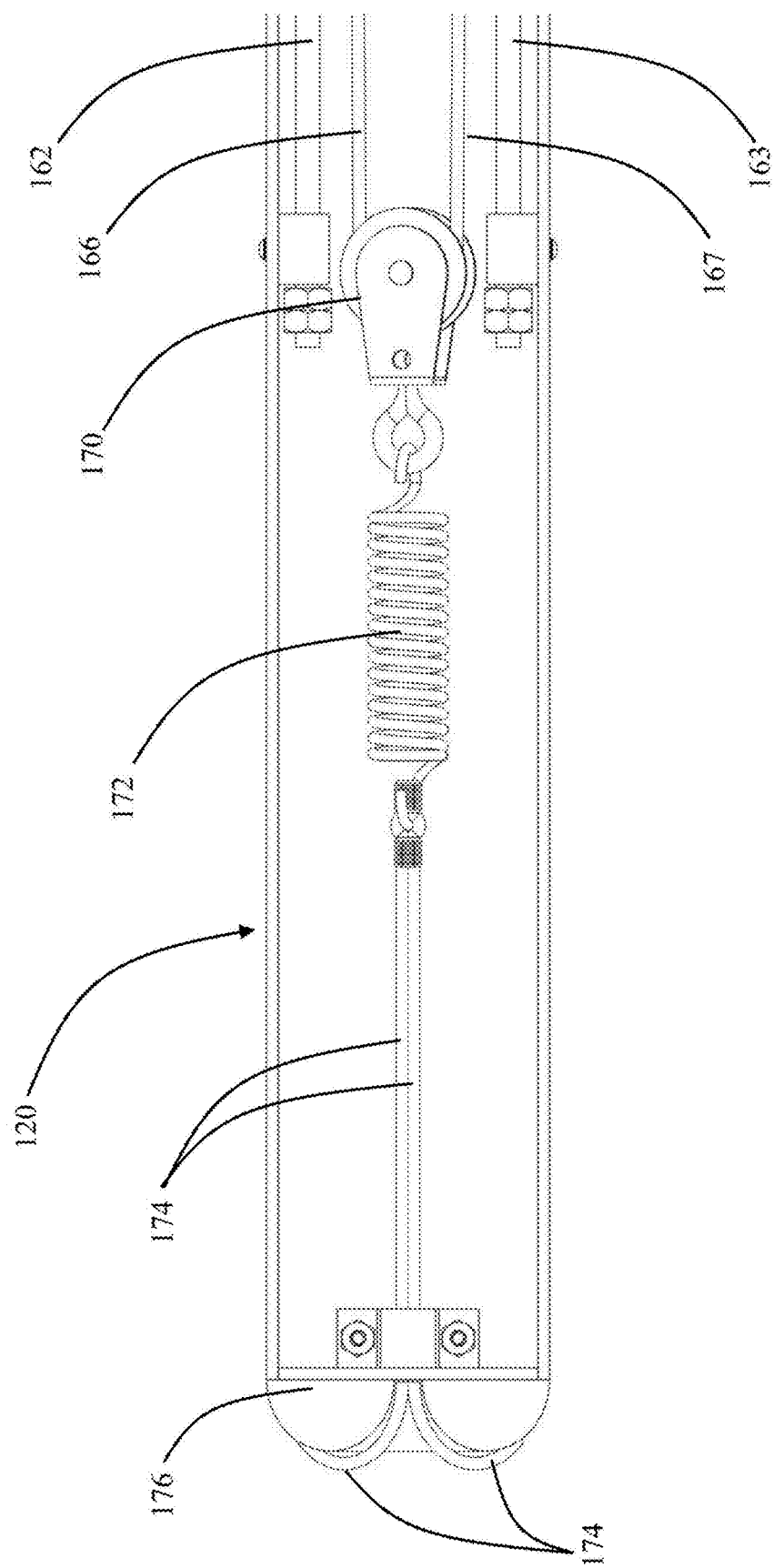
FIG. 11 is an enlarged top view of a left end portion of the backing frame of FIG. 8.

The second set of control wires, in the preferred embodiment, includes control wires 182, 183. Each of control wires 182, 183 is connected to one of the square nuts 164, 165. The control wires 182, 183 run to a stack of two concentric pulleys 184 before extending out to an end of the second member 121. In particular, control wire 182 runs from square nut 164 to pulley 184, and then traverses downward in FIG. 9. Similarly, control wire 183 runs from square nut 165 to a different pulley 184, and then traverses upward in FIG. 9. The two pulleys 184 are independent of one another, thus enabling wires 182, 183 to be controlled independently.

To adjust the elevation angle of the optical member 110 (e.g., mirror), the two lead screws 162, 163 are turned at the same time and the square nuts 164, 165 moved in unison. To lower the front edge of the optical member 110 (e.g., mirror), for example, the square nuts 164, 165 are moved in unison to the right in FIG. 8. This reels in control wires 174 into the left end of the first member 120 (e.g., shortens the length of the wires 174 between end of the first member 120 and the stock members 140 they're coupled to) while reeling out (e.g., paying out) control wires 182, 183 from the second member 121 (e.g., increases the length of the wires 182, 183 between ends of the second member 121 and the stock member 140 they're coupled to). To raise the front edge of the optical member 110 (e.g., mirror), for example, the square nuts 164, 165 are moved in unison to the left, which reels out (e.g., pays out) control wires 174 from the left end of first member 120 while reeling in control wires 182, 183 from the ends of the second member 121.

To adjust the roll angle of the optical member 110 (e.g., mirror), the two lead screws 162, 163 are turned at the same time so as to make the square nuts 164, 165 move in opposite directions. To lower the edge of the optical member 110 (e.g., mirror) coinciding with the top of FIG. 8, for example, the square nut 164 is moved to the left and the square nut 165 moved an equal distance to the right in FIG. 8. This reels in control wire 183 (e.g., shortens the length of wire 183 between end of the second member 121 and the stock members 140 it's coupled to) and reels out (e.g., pays out) control wire 182 (e.g., increases the length of wire 182 between end of the second member 121 and the stock members 140 it's coupled to). The position of pulley 170 remains stationary, resulting in no change in height of the left end of the first member 120.

To lower the edge of the optical member 110 (e.g., mirror) coinciding with the bottom of FIG. 8, for example, the square nut 164 is moved to the right and the square nut 165 moved an equal distance to the left in FIG. 8. This reels in control wire 182 and reels out (e.g., pays out) control wire 183. The position of pulley 170 remains stationary, resulting in no change in height of the left end of the direct member 120.

The combination of motors, lead screws, and control wires is referred to herein as a "differential drive". By turning the lead screw 162, 163 an appropriate amount, the differential drive can drive the optical member 110 (e.g., mirror) to face any direction in nearly a 2*pi solid angle. As one skilled in the art will appreciate, the spring 172 advantageously provides a biasing force as needed to maintain tension on the wires 174, 182, 183 at all times for all angles of the optical member 110 (e.g., mirror). Additionally, the spring 172 advantageously accommodates changes in the length(s) of the wires 174, 182, 183 (e.g., the length that extends between the ends of the first and second members 120, 121 and the stock members 140) over the range of motion of the optical member 110.

Referring to FIG. 12, the motors 169, 161 can mount directly to the second member 121. The drive shafts of motors 169, 161 can couple to the lead screws 162, 163 by means of couplings 190. In the preferred embodiment, couplings 190 include a set screw that engages a planar facet on the end of the lead screw. This kind of drive is sometimes referred to as a D-drive. In the preferred embodiment, a D-drive enables the motors to slide onto a lead screw/coupling and slide off the lead screw/coupling during replacement. Thus, the heliostat motors 169, 161 in the preferred embodiment can advantageously be repaired or replaced in the field with ease.

The first member 120 includes wire guide 176 and the second member 121 includes a pair of wire guides 194 configured to change the direction of wires 174 and wires 182, 183, respectively. In the preferred embodiment, the wire guides 176, 194 are plastic with arcuate channels that can receive a wire thereon. In other embodiments, the wire guides are or include pulleys. The location of the wire guides at the extreme ends of the first and second members 120, 121 provide exceptional leverage when rotating the optical member 110 (e.g., mirror) and holding the optical member 110 (e.g., mirror) stationary. This leverage, in turn, enables the heliostat 100 to employ small low-cost motors, thus reducing the overall cost of the heliostat 100 compared to prior art heliostats.

In the preferred embodiment, the heliostat 100 includes ballast units 150. The ballast units 150 are stackable and configured to stack in a modular manner. The bottom of each ballast unit 150 can rest atop two horizontal beams 140 where they protrude from the corner of the tripod. In the preferred embodiment, each ballast unit 150 includes recesses that can rest atop two horizontal beams 140, and the top of each ballast unit 150 mimics the two horizontal beams 140. Thus, multiple ballast units 150 can be stacked one atop the other to achieve the desired ballast weight.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer, processor, electronic circuit, or module capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including electronic circuits such as personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

Additional Embodiments

In embodiments of the present invention, a heliostat, and method of making the same, may be in accordance with any of the following clauses:

Clause 1: A heliostat, comprising:
an optical member;
a mounting frame disposed behind the optical member;

a stand configured to support the mounting frame and optical member thereon, the stand comprising a first plurality of linear members that extend to an upper portion of the stand disposed below the mounting frame; and a hinge assembly having a first portion coupled to the upper end of the stand and a second portion coupled to the mounting frame, the second portion configured to pivot relative to the first portion about a first axis, the second portion further configured to pivot relative to the first portion about a second axis that is orthogonal to the first axis.

Clause 2: A heliostat, comprising:

an optical member;

a mounting frame disposed behind the optical member;

a stand configured to support the mounting frame and optical member thereon, the stand comprising a first plurality of linear members that extend to an upper portion of the stand disposed below the mounting frame; and a hinge assembly having a first portion coupled to the upper end of the stand and a second portion coupled to the mounting frame, the second portion configured to pivot relative to the first portion in a first direction, the second portion further configured to pivot relative to the first portion in a second direction that is orthogonal to the first direction.

Clause 3: The heliostat of any preceding clause, wherein the first axis and second axis of the hinge assembly are offset from each other.

Clause 4: The heliostat of any preceding clause, wherein the optical member comprises a mirror.

Clause 5: The heliostat of any preceding clause, wherein the first plurality of linear members define a tripod and the upper end of the stand comprises an apex of one or more of the first plurality of linear members, the first portion of the hinge assembly coupled to one or more of the first plurality of linear members proximate to the apex.

Clause 6: The heliostat of any preceding clause, wherein the stand further comprises a second plurality of linear members that each extend along a generally horizontal plane relative to a central axis of the stand that extends through the upper portion, each of the second plurality of linear members configured to couple to a distal portion of the first plurality of linear members and have end portions that extend past the first plurality of linear members, the end portions configured to receive a ballast unit thereon.

Clause 7: The heliostat of any preceding clause, wherein the mounting frame comprises a first member and a second member that extend perpendicular to each other.

Clause 8: The heliostat of any preceding clause, wherein the mounting frame comprises a first member and a second member that extend perpendicular to each other and define a T-shape.

Clause 9: The heliostat of any preceding clause, further comprising a first pair of control wires each having a distal end coupled to a different one of the first plurality of linear members and a proximal end within the mounting frame, and a second pair of control wires having distal ends coupled to a third one of the first plurality of linear members and proximal ends extending within the mounting frame, wherein the first pair of control wires extend through a first opening in the mounting frame, one of the second pair of control wires extends though a second opening of the mounting frame and another of the second pair of control wires extends through a third opening of the mounting frame, and wherein the first, second and third openings are spaced apart from each other such that a linear distance therebetween defines a triangle.

Clause 10: The heliostat of any preceding clause, further comprising a wire guide attached to the mounting frame proximate each of the first, second and third openings, each wire guide having an arcuate surface configured to engage one or more of the first pair of control wires and second pair of control wires to facilitate one or both of a reeling in and a paying out of the first pair of control wires and the second pair of control wires.

Clause 11: The heliostat of any preceding clause, further comprising a first pair of control wires each having a distal end coupled to a different one of the first plurality of linear members and a proximal end within the first member of the mounting frame, and a second pair of control wires having distal ends coupled to a third one of the first plurality of linear members and proximal ends extending within opposite ends of the second member of the mounting frame.

Clause 12: The heliostat of any preceding clause, further comprising an actuator for reeling in or paying out one or both of the first pair of control wires and second pair of control wires to adjust one or both of an elevation angle and a roll angle of the optical member.

Clause 13: The heliostat of any preceding clause, further comprising means for reeling in or paying out one or both of the first pair of control wires and second pair of control wires to adjust one or both of the elevation angle and the roll angle of the optical member.

Clause 14: The heliostat of any preceding clause, further comprising a first pair of wire guides attached to opposite ends of the second member and a third wire guide attached to an end of the first member, the first pair of wire guides having an arcuate surface configured to engage the second pair of control wires to facilitate a reeling in and a paying out of the second pair of control wires from the second member, the third wire guide having an arcuate surface configured to engage the first pair of control wires to facilitate a reeling in and a paying out of the first pair of control wires from the first member.

Clause 15: The heliostat of any preceding clause, further comprising a pair of electric motors mounted to the mounting frame and operable to control the adjustment of the elevation and roll angles of the optical member.

Clause 16: A heliostat, comprising:

an optical member;

a mounting frame disposed behind the optical member;

a tripod stand having three stock members that extend to an apex, the tripod stand configured to support the mounting frame and optical member thereon;

a plurality of wires configured to connect the mounting frame and the three stock members; and a plurality of actuators coupled to the mounting frame and operatively coupled to the plurality of wires, the plurality of actuator operable to adjust one or both of an elevation angle and a roll angle of the optical member.

Clause 17: The heliostat of any preceding clause, further comprising a hinge assembly having a first portion coupled to one or more of the stock members proximate the apex and a second portion coupled to the mounting frame, the second portion configured to pivot relative to the first portion in a first direction to adjust the elevation angle of the optical member, the second portion further configured to pivot relative to the first portion in a second direction to adjust the roll angle of the optical member.

Clause 18: The heliostat of any preceding clause, wherein the second portion pivots relative to the first portion in the first direction about a first axis, and the second portion pivots relative to the first portion in the second direction about a second axis that is orthogonal to and offset from the first axis.

Clause 19: The heliostat of any preceding clause, further comprising a hinge assembly having a first portion coupled to one or more of the stock members proximate the apex and a second portion coupled to the mounting frame, the second portion configured to pivot relative to the first portion about a first axis to adjust the elevation angle of the optical member, the second portion further configured to pivot relative to the first portion about a second axis that is orthogonal to and offset from the first axis to adjust the roll angle of the optical member.

Clause 20: The heliostat of any preceding clause, wherein the optical member comprises a mirror.

Clause 21: The heliostat of any preceding clause, wherein the tripod stand further comprises three base cross members, each interconnecting two of the three stock members, the three base cross members configured to receive a ballast unit thereon.

Clause 22: The heliostat of any preceding clause, wherein the mounting frame comprises a first member and a second member that extend perpendicular to each other.

Clause 23: The heliostat of any preceding clause, wherein a first pair of the plurality of wires have distal ends that couple to two of the three stock members and proximal ends within the first member of the mounting frame, and a second pair of the plurality of wires have distal ends that couple to a third one of the three stock members and proximal ends extending within opposite ends of the second member of the mounting frame.

Clause 24: The heliostat of any preceding clause, further comprising a pair of lead screws that removably couple to the plurality of actuators, a pair of nuts movably coupled to the pair of lead screws, the plurality of wires operatively coupled to the lead screws such that rotation of the lead screws in the same direction by the plurality of actuators reels in or pays out the first pair of the plurality of wires to adjust the elevation angle of the optical member and rotation of the lead screws in opposite directions by the plurality of actuators reels in one of the second pair of the plurality of wires and pays out another of the second pair of the plurality of wires to adjust the roll angle of the optical member.

Clause 25: The heliostat of any preceding clause, further comprising a plurality of wire guides at ends of the mounting frame, the wire guides having an arcuate surface configured to engage the plurality of wires to facilitate a reeling in and a paying out of the plurality of wires relative to the mounting frame.

Clause 26: A heliostat, comprising:
an optical member;
a mounting frame disposed behind the optical member;
a stand configured to support the mounting frame and optical member thereon, the stand extending to an upper end;
a hinge assembly having a first portion coupled to the upper end of the stand and a second portion coupled to the mounting frame, the second portion configured to pivot relative to the first portion about a first axis, the second portion further configured to pivot relative to the first portion about a second axis that is orthogonal to and offset from the first axis; and
direct drive means for adjusting one or both of an elevation angle and a roll angle of the optical member.

Clause 27: The heliostat of any preceding clause, wherein the direct drive means comprises a pair of motors removably coupleable to the mounting frame.

While certain embodiments of the invention have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present invention is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the heliostat need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form variations of the discussed heliostat.

What is claimed is:

1. A heliostat, comprising:
   an optical member;
   a mounting frame disposed behind the optical member;
   a stand configured to support the mounting frame and optical member thereon, the stand comprising at least three legs that extend to an upper portion of the stand disposed below the mounting frame;
   a hinge assembly having a first portion coupled to the upper end of the stand and a second portion coupled to the mounting frame, the second portion configured to pivot relative to the first portion in a first direction, the second portion further configured to pivot relative to the first portion in a second direction that is orthogonal to the first direction; and
   a differential drive system comprising
      a pair of actuators,
      a spring, a first end of the spring operatively coupled to the pair of actuators, and
      a plurality of wires configured to operatively connect the optical member and the stand, including a first pair of wires extending between first ends and second ends, the first ends coupling to the stand at first and second spaced apart locations, and a second pair of wires extending between first ends and second ends, the first ends of the second pair of wires coupling to the stand at at least one additional location,
   wherein each of the second ends of the first pair of wires operatively couple to both actuators via the spring,
   wherein each of the second ends of the second pair of wires operatively couple to one of the pair of actuators,
   wherein operation of the pair of actuators in the same direction reels in or pays out the first pair of wires to adjust a pitch angle of the optical member and
   wherein operation of the pair of actuators in opposite directions reels in one of the second pair of wires and pays out the other of the second pair of wires to adjust a roll angle of the optical member, the spring applying a bias force on the first and second pair of wires to maintain the first and second pair of wires under tension and configured to accommodate differential changes in a length of the first and second pair of wires between the optical member and the stand over a range of pitch and roll motion of the optical member.

2. The heliostat of claim 1, wherein the second portion pivots relative to the first portion in the first direction about a first axis, and the second portion pivots relative to the first portion in the second direction about a second axis that is offset from the first axis.

3. The heliostat of claim 1, wherein the optical member comprises a mirror.

4. The heliostat of claim 1, wherein the at least three legs define a tripod and the upper end of the stand comprises an apex of one or more of the at least three legs, the first portion of the hinge assembly coupled to one or more of the at least three legs proximate to the apex.

5. The heliostat of claim 1, wherein the stand further comprises at least three cross members that each extend along a generally horizontal plane relative to a central axis of the stand that extends through the upper portion, each of the at least three cross members configured to couple to a distal portion of the at least three legs and have end portions that extend past the at least three legs, the end portions configured to receive a ballast unit thereon.

6. The heliostat of claim 1, wherein the mounting frame comprises a first member and a second member that extend perpendicular to each other and define a T-shape.

7. The heliostat of claim 1, wherein the first pair of wires extend through a first opening in the mounting frame, one of the second pair of wires extends though a second opening of the mounting frame and another of the second pair of wires extends through a third opening of the mounting frame, and wherein the first, second and third openings are spaced apart from each other such that a linear distance therebetween defines a triangle.

8. The heliostat of claim 7, further comprising a wire guide attached to the mounting frame proximate each of the first, second and third openings, each wire guide having an arcuate surface configured to engage one or more of the first pair of wires and second pair of wires to facilitate one or both of a reeling in and a paying out of the first pair of wires and the second pair of wires.

9. A heliostat, comprising:
an optical member;
a mounting frame disposed behind the optical member;
a stand having at least three legs, the stand configured to support the mounting frame and optical member thereon; and
a differential drive system comprising
a pair of actuators,
a spring, a first end of the spring operatively coupled to the pair of actuators, and
a plurality of wires configured to operatively connect the optical member and the stand, including a first pair of wires extending between first ends and second ends, the first ends coupling to the stand at first and second spaced apart locations, and a second pair of wires extending between first ends and second ends, the first ends of the second pair of wires coupling to the stand at at least one additional location,
wherein each of the second ends of the first pair of wires operatively couple to both actuators via the spring,
wherein each of the second ends of the second pair of wires operatively couple to one of the pair of actuators,
wherein operation of the pair of actuators in the same direction reels in or pays out the first pair of wires to adjust a pitch angle of the optical member and
wherein operation of the pair of actuators in opposite directions reels in one of the second pair of wires and pays out the other of the second pair of wires to adjust a roll angle of the optical member, the spring applying a bias force on the first and second pair of wires to maintain the first and second pair of wires under tension and configured to accommodate differential changes in a length of the first and second pair of wires between the optical member and the stand over a range of pitch and roll motion of the optical member.

10. The heliostat of claim 9, further comprising a hinge assembly having a first portion coupled to one or more of the at least three legs proximate an apex of the stand and a second portion coupled to the mounting frame, the second portion configured to pivot relative to the first portion in a first direction to adjust the elevation angle of the optical member, the second portion further configured to pivot relative to the first portion in a second direction to adjust the roll angle of the optical member.

11. The heliostat of claim 10, wherein the second portion pivots relative to the first portion in the first direction about a first axis, and the second portion pivots relative to the first portion in the second direction about a second axis that is orthogonal to and offset from the first axis.

12. The heliostat of claim 9, wherein the stand further comprises three base cross members, each interconnecting two of the at least three legs, the three base cross members configured to receive a ballast unit thereon.

13. The heliostat of claim 9, wherein the mounting frame comprises a first member and a second member that extend perpendicular to each other.

14. The heliostat of claim 13, wherein the first pair of the plurality of wires couple to two of the at least three legs and within the first member of the mounting frame, and the second pair of the plurality of wires couple to a third one of the at least three legs and extend within opposite ends of the second member of the mounting frame.

15. The heliostat of claim 9, further comprising a pair of lead screws that removably couple to the pair of actuators, a pair of nuts movably coupled to the pair of lead screws, the plurality of wires operatively coupled to the lead screws such that rotation of the lead screws in the same direction by the pair of actuators reels in or pays out the first pair of the plurality of wires to adjust the elevation angle of the optical member and rotation of the lead screws in opposite directions by the pair of actuators reels in one of the second pair of the plurality of wires and pays out another of the second pair of the plurality of wires to adjust the roll angle of the optical member.

16. The heliostat of claim 9, further comprising a plurality of wire guides at ends of the mounting frame, the wire guides having an arcuate surface configured to engage the plurality of wires to facilitate a reeling in and a paying out of the plurality of wires relative to the mounting frame.

17. A heliostat, comprising:
an optical member;
a mounting frame disposed behind the optical member;
a stand configured to support the mounting frame and optical member thereon, the stand extending to an upper end;
a hinge assembly having a first portion coupled to the upper end of the stand and a second portion coupled to the mounting frame, the second portion configured to pivot relative to the first portion about a first axis, the second portion further configured to pivot relative to the first portion about a second axis that is orthogonal to and offset from the first axis; and
direct drive means for adjusting one or both of an elevation angle and an roll angle of the optical member, the direct drive means comprising
a pair of actuators,
a spring, a first end of the spring operatively coupled to the pair of actuators, and
a plurality of wires configured to operatively connect the optical member and the stand, including a first pair of wires extending between first ends and second ends, the first ends coupling to the stand at first and second spaced apart locations, and a second pair of wires extending between first ends and second ends, the first ends of the second pair of wires coupling to the stand at at least one additional location,
wherein each of the second ends of the first pair of wires operatively couple to both actuators via the spring, wherein each of the second ends of the second pair of wires operatively couple to one of the pair of actuators, wherein operation of the pair of actuators in the same direction reels in or pays out the first pair of wires to adjust a pitch angle of the optical member and wherein operation of the pair of actuators in opposite directions reels in one of the second pair of wires and pays out the other of the second pair of wires to adjust a roll angle of the optical member, the spring applying a bias force on the first and second pair of wires to maintain the first and second pair of wires under tension and configured to accommodate differential changes in a length of the first and second pair of wires between the optical member and the stand over a range of pitch and roll motion of the optical member.

18. The heliostat of claim 17, wherein the pair of actuators are a pair of motors removably coupleable to the mounting frame.

* * * * *

UNITED STATES PATENT AND TRADEMARK OFFICE
CERTIFICATE OF CORRECTION

| | |
|---|---|
| PATENT NO. | : 11,323,063 B2 |
| APPLICATION NO. | : 17/114845 |
| DATED | : May 3, 2022 |
| INVENTOR(S) | : William Gross et al. |

It is certified that error appears in the above-identified patent and that said Letters Patent is hereby corrected as shown below:

In the Specification

On Column 7, Line 64: Delete "though" and insert -- through --.

In the Claims

On Column 13, Line 12 (Approx.): In Claim 7, delete "though" and insert -- through --.

Signed and Sealed this
Twenty-seventh Day of September, 2022

*Katherine Kelly Vidal*

Katherine Kelly Vidal
*Director of the United States Patent and Trademark Office*